(12) United States Patent
Canning et al.

(10) Patent No.: US 6,539,135 B1
(45) Date of Patent: Mar. 25, 2003

(54) PROCESS FOR CONTROL OF BIREFRINGENCE IN WAVEGUIDES

(75) Inventors: John Canning, Carlton (AU); Mattias Lennart Aslund, Cronulla (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/831,533

(22) PCT Filed: Nov. 12, 1999

(86) PCT No.: PCT/AU99/01003

§ 371 (c)(1),
(2), (4) Date: Aug. 1, 2001

(87) PCT Pub. No.: WO00/29880

PCT Pub. Date: May 25, 2000

(30) Foreign Application Priority Data

Nov. 12, 1998 (AU) .................................. PP7166

(51) Int. Cl.$^7$ .............................. G02B 6/27; G02B 6/12
(52) U.S. Cl. ........................................... 385/11; 385/14
(58) Field of Search ...................................... 385/11, 14

(56) References Cited

U.S. PATENT DOCUMENTS

| | | | |
|---|---|---|---|
| 4,400,052 A | * | 8/1983 | Alferness et al. ............. 385/11 |
| 4,455,267 A | | 6/1984 | Strahan et al. |
| 4,781,424 A | | 11/1988 | Kawachi et al. |
| 4,889,401 A | | 12/1989 | Klement et al. |
| 5,341,444 A | | 8/1994 | Henry et al. |
| 5,506,925 A | | 4/1996 | Greene et al. |
| 6,442,311 B1 | * | 8/2002 | Barbarossa et al. ......... 385/129 |

FOREIGN PATENT DOCUMENTS

| | | |
|---|---|---|
| WO | WO8403362 | 8/1984 |

\* cited by examiner

*Primary Examiner*—John D. Lee
*Assistant Examiner*—Tina M Lin
(74) *Attorney, Agent, or Firm*—Ladas & Parry

(57) ABSTRACT

A method of modifying birefringence properties of a waveguide formed within a carrier, the method comprising the steps of inducing a stress anisotropy in the waveguide and effecting a differential decrease in a first refractive index of one mode in the waveguide with respect to a second refractive index of another mode of the waveguide.

7 Claims, 4 Drawing Sheets

PROCESS FOR CONTROL OF BIREFRINGENCE IN WAVEGUIDES

FIELD OF THE INVENTION

The present invention relates to a process for the control of the birefringence properties in waveguides.

BACKGROUND OF THE INVENTION

It is known to construct optical waveguide devices having internal waveguide structures. These devices can be fabricated utilizing plasma enhanced chemical vapour deposition processes on a silicon substrate. FIG. 1 illustrates such a layer 1 formed on a substrate 2 including a waveguide 3 therein.

Often non-symmetrical birefringence effects will result from the formation process. The first birefringent effect denoted $\beta_{form}$ will be due to the circumference characteristics of the waveguide 3. The second effect denoted $\beta_{stress}$ will be due to several stresses associated with the thermal coefficient mismatch of the substrate 2 and deposited layer 1.

There is therefore a need to alter the birefringence properties of such waveguides to nullify the birefringence should this be required.

On the other hand, it may alternatively be desirable to alter birefringence in other internal waveguide structures, for example in the core of an optical fibre. The alteration must not necessarily be with the view to nullify the birefringence, but could for example be with the view to introduce birefringence.

SUMMARY OF THE INVENTION

The present invention provides a method of modifying birefringence properties of an optical waveguide formed within a carrier, comprising:

inducing a stress anisotropy in the waveguide;

exposing the waveguide to an electromagnetic radiation selected to induce refractive index changes of first and second polarisation modes of the waveguide as a function of the fluence of radiation exposure;

terminating the radiation exposure at a fluence for which the refractive index of the first polarisation mode decreases in response to increasing fluence and the refractive index of the second polarisation mode increases in response to increasing fluence.

It has been found by the applicant that stress-sensitive transitions in a waveguide can be utilised to alter the birefringence properties of the waveguide.

The step of inducing the stress anisotropy in the waveguide may be performed as an independent pre-stressing step.

The radiation may comprise UV radiation.

The carrier may comprise a planar structure in which the waveguide is buried.

Alternatively, the carrier may comprise a cladding of an optical fibre, the waveguide comprising the core of the optical fibre.

The waveguide may be formed from a silica-based material.

Where the stress anisotropy is already present in the waveguide, the invention may alternatively be defined as a method of modifying birefringence properties of an optical waveguide formed within a carrier, comprising:

exposing the waveguide to an electromagnetic radiation selected to induce refractive index changes of first and second polarisation modes of the waveguide as a function of the fluence of radiation exposure;

terminating the radiation exposure at a fluence for which the refractive index of the first polarisation mode decreases in response to increasing fluence and the refractive index of the second polarisation mode increases in response to increasing fluence.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

Figure 1:
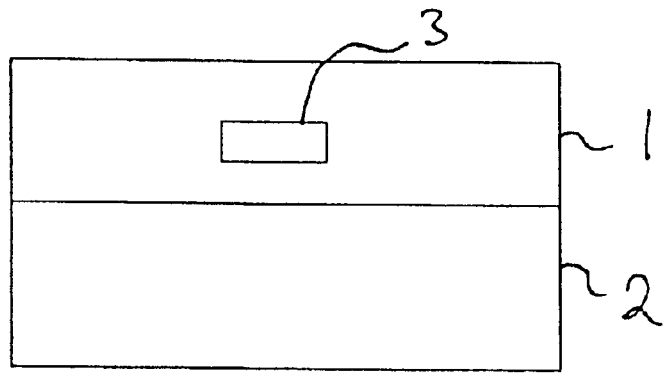
FIG. 1 illustrates an idealised wafer and waveguide.
Figure 2:
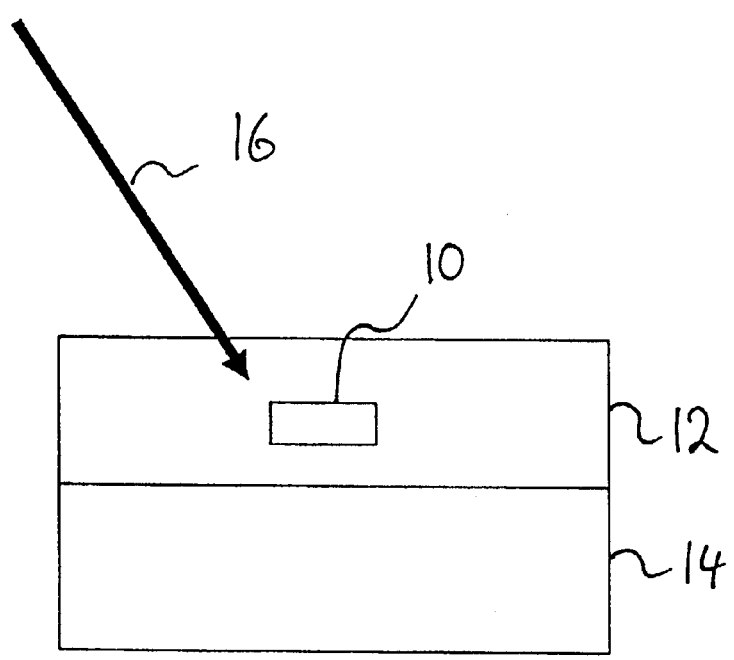
FIG. 2 illustrates a method embodying the present invention.

As illustrated in FIG. 2, a waveguide 10 is formed in a first substrate in the form of a silica layer 12. The silica layer 12 is in turn formed on a second substrate in the form of a silicon wafer 14.

Importantly, in this embodiment a stress anisotropy is present in the waveguide 10 due to a thermal processing during its deposition. This is as a result of differences between the thermal expansion coefficients of the silica layer 12 and the silicon wafer 14 respectively. The waveguide 10 may e.g. be deposited utilizing plasma enhanced chemical vapour deposition (PECVD). More particular, the stress anisotropy is such that it gives rise to compression on the waveguide 10 along the TE vector.

UV radiation 16 is then applied to the waveguide 10 to alter the birefringence properties of the waveguide 10.

In the following, a qualitative model will be described which may explain the observed alteration in the birefringence properties of the waveguide 10.

Under certain conditions, UV-processing of germanosilicate waveguides leads to two types of UV-induced refractive index changes both an increase (positive type I) and a decrease (negative type IIa). Since the rapid annealing threshold of UV-densified glass is generally low (~320° C.), the type I glass will tend to be of higher potential energy than the undensified state. To reach this state a threshold barrier, $h_I$, needs to be overcome, requiring that energy be dumped into the glass matrix, usually as UV photons.

However, with sufficient photon energy and after a certain fluence, the glass transforms again and begins dilating. Since this dilation nearly always follows densification it must be related to the build-up of an internal energy until a second potential energy barrier is overcome. This rollover threshold from positive to negative has been shown to be sensitive to tensile forces applied along an optical fibre and closely related to stress changes in planar waveguides. Hence, the potential energy barriers to be overcome ($h_{IIa}$) differ between TE and TM modes due to the waveguide stress anisotropy.

This qualitative model consequently predicts the ability to generate a complex structure in silica where the glass properties can be substantially different than would otherwise be expected. When looking at the growth, a simple assumption can therefore be made. Starting from the basis described above and assuming that the processes describing TE and TM growth can be described independent of each other (although in actuality they will be related through the stress-optic relations), a simple exponential growth model can be used for both index regimes. The qualitative result, if the general model is correct, will provide an adequate description of the differences between the two polarization states.

Thus, for densification seen by the TM mode, the average index is described as $\Delta>_{TM} = \Delta>^+_{TM}$, and the TE mode, where there is initial densification and then subsequent dilation characterised by a distinct threshold, $f_{thres}$ as $\Delta>_{TE} = \Delta>^{+\Delta>-}_{TE}$, where $\Delta \bar{n}^+ \approx \Delta \bar{n}_{max}^+ (1-e^{-D(f)})$ $D(f) = f/f_s$ (1)

where $\Delta \bar{n}_{max}^-$ is the peak index modulation achievable, and $D(f)$ is a function describing the fluence and f is the fluence where $f_s$ is the saturation fluence, and $D(f) = 0$ $\Delta \bar{n}^- \approx -\Delta \bar{n}_{max}^- (1-e^{-D(f)})$ $D(f) = (f - f_{thres})/f_s$ $0 < f < f_{thres}$ $f > f_{thres}$ (2)

where $\Delta \bar{n}_{max}^-$ is the maximum negative index possible. Values of $5 \times 10^{-4}$(TM), $4.8 \times 10^{-4}$ (TE), and $2 \times 10^{-3}$ (TE) for maximum positive TM and TE and negative TE induced index changes have been used since these are typical of those obtained experimentally in our planar samples.

Figure 3:
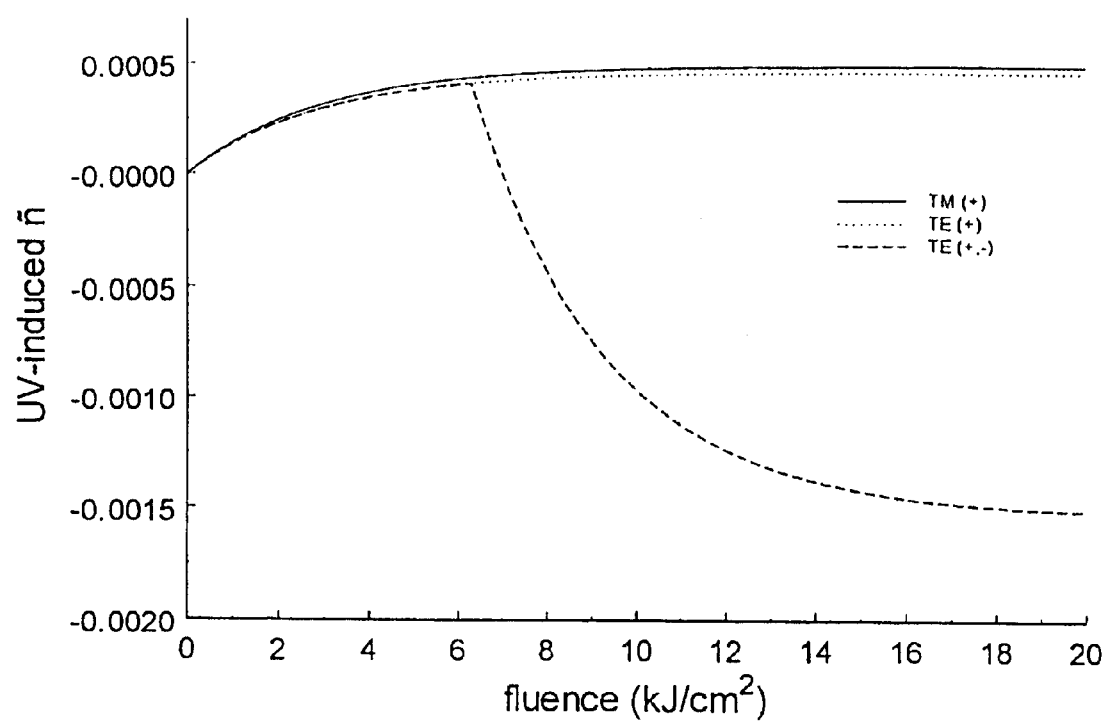
FIG. 3 shows theoretical growths profiles for TE and TM modes of a waveguide embodying the present invention.

FIG. 3 shows the expected theoretical growth profiles. When there is an applied anisotropic stress along the TE vector, the TE mode can experience type IIa growth whilst the TM mode does not. The induced difference in effective average index leads to a birefringence two orders of magnitude larger than that in the positive regime where both growth processes coincide in time. The physical mechanism is related to the rollover threshold of the TE state which the TM mode does not see. If this model is translatable to experiment then the glass must be undergoing significant structural re-orientation resulting in a large anisotropy. The network can therefore no longer be regarded as completely random.

Figure 4:
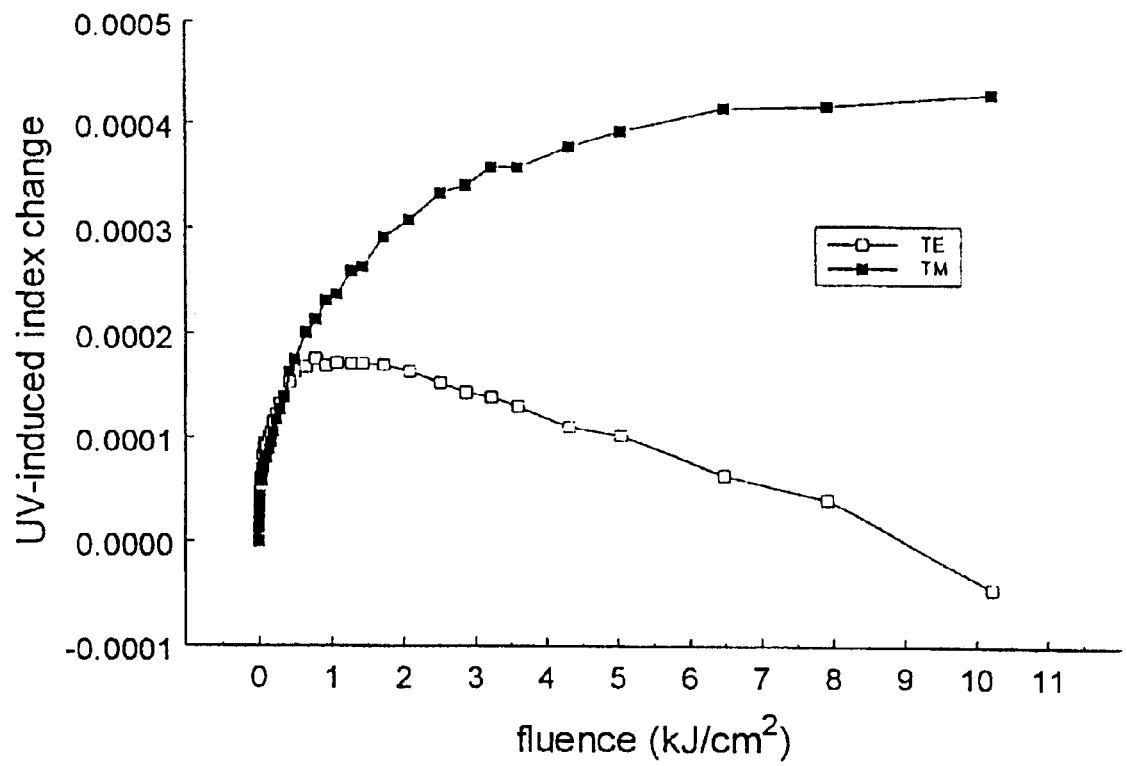
FIG. 4 shows measured growths profiles for TE and TM modes of a waveguide embodying the present invention.

Experimental results recently published confirm this prediction. Large divergence in growth behaviour between polarisation eigenstates of a buried waveguide with stress anisotropy and exposed to UV light has been observed [3]. An asymmetric Mach-Zehnder was irradiated in one arm and the induced effective indices for both polarisation states were extracted from the changes in the device spectral response for each state. For the sake of comparison the results are reproduced in FIG. 4. It can be seen that when both polarisation states are in the positive index regime the UV-induced birefringence is small. However, when the TE state rolls over whilst the TM states saturates in the positive regime, this birefringence becomes very large, in accordance with the model described above. The experiment was not taken to saturation.

Figure 5:
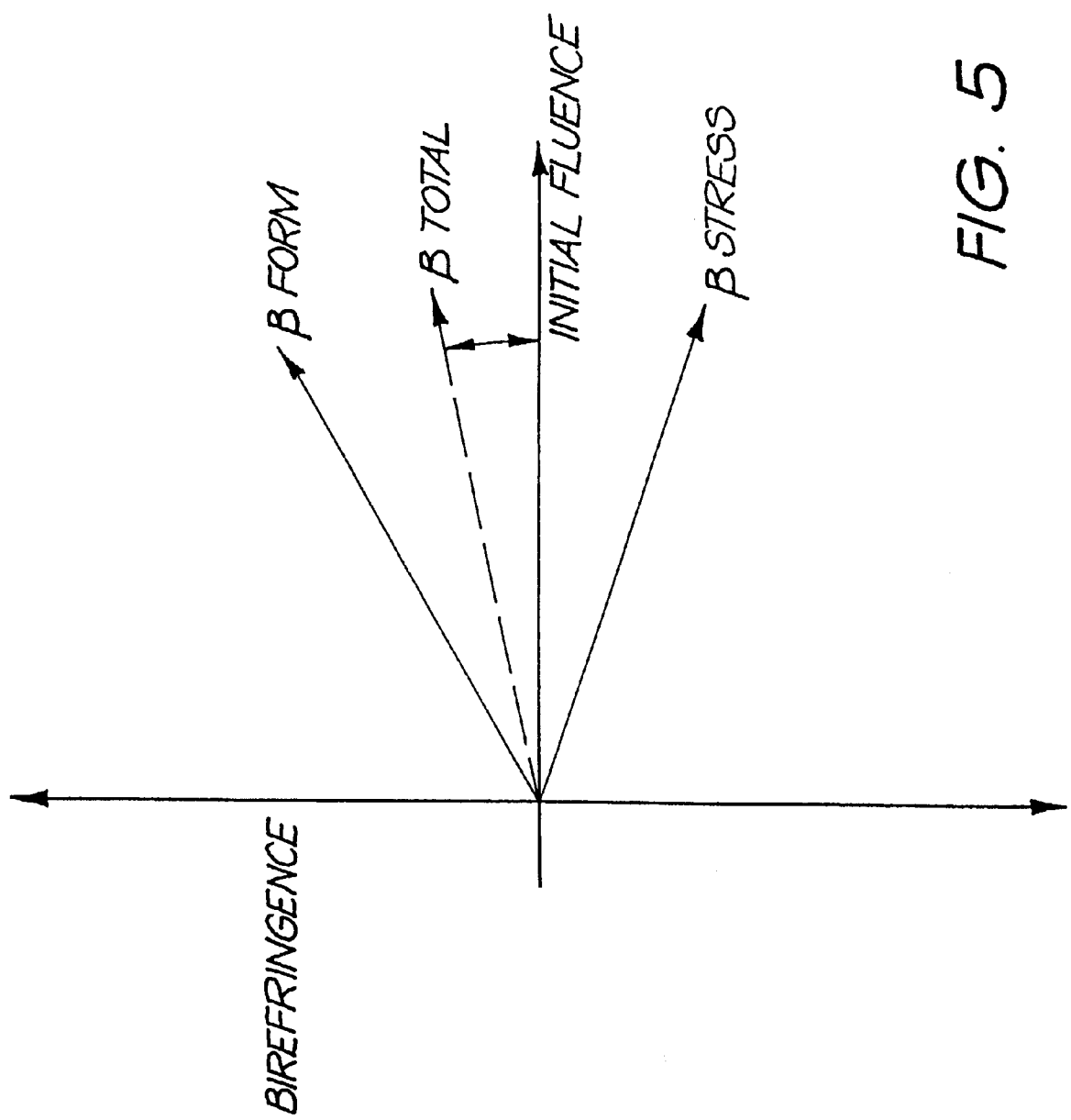
FIG. 5 illustrates a particular relation between $\beta_{form}$ and $\beta_{stress}$ for an embodiment of the present invention.

The physical consequences of such a model have potentially important applications, including using any large structural orientation to maximise induced non-linearities in the glass. Such experiments will help confirm the nature of the induced changes in the glass network.

Where it is desired to nullify birefringence in a waveguide which exhibits both $\beta_{form}$ and $\beta_{stress}$, it is important to note that the UV-induced birefringence alteration described above will be of same "sign" as $\beta_{stress}$. Therefore, in order to allow compensation of $\beta_{form}$ by UV induced birefringence alterations, the conditions must be such that the "sign" of $\beta_{stress}$ is opposed to the one of $\beta_{form}$. This is schematically illustrated in FIG. 5.

The present invention has applications for processes that are enhanced by structural anisotropy, such as UV-poling.

The UV-induced changes of interest are mostly permanent, suggesting longer range collective changes in the glass network may occur.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

We claim:

1. A method of modifying birefringence properties of an optical waveguide formed within a carrier, comprising:

inducing a stress anisotropy in the waveguide;

exposing the waveguide to an electromagnetic radiation selected to induce refractive index changes of first and second polarisation modes of the waveguide as a function of the fluence of radiation exposure;

terminating the radiation exposure at a fluence for which the refractive index of the first polarisation mode decreases in response to increasing fluence and the refractive index of the second polarisation mode increases in response to increasing fluence.

2. A method as claimed in claim 1 wherein the step of inducing the stress anisotropy in the waveguide is performed as an independent pre-stressing step.

3. A method as claimed in either claim 1 or claim 2, wherein the radiation comprises UV radiation.

4. A method as claimed in either claim 1 or claim 2, wherein the carrier comprises a planar structure in which the waveguide is buried.

5. A method as claimed in any one of claims 1 to 3 wherein the carrier comprises a cladding of an optical fibre and the waveguide comprises the core of the optical fibre.

6. A method as claimed in either claim 1 or claim 2, wherein the waveguide is formed from a silica-based material.

7. A method of modifying birefringence properties of an optical waveguide formed within a carrier, the waveguide having a stress anisotropic, comprising:

exposing the waveguide to an electromagnetic radiation selected to induce refractive index changes of first and second polarisation modes of the waveguide as a function of the fluence of radiation exposure;

terminating the radiation exposure at a fluence for which the refractive index of the first polarisation mode decreases in response to increasing fluence and the refractive index of the second polarisation mode increases in response to increasing fluence.

* * * * *